(12) United States Patent
Bharucha et al.

(10) Patent No.: US 12,039,530 B2
(45) Date of Patent: Jul. 16, 2024

(54) SYSTEM AND METHOD FOR AUTHORIZING TEMPORARY USE OF ACCOUNTS

(71) Applicant: The Toronto-Dominion Bank, Toronto (CA)

(72) Inventors: Dinshaw Bharucha, Toronto (CA); Maja Bukorovic, Toronto (CA); Lydia Grace Cervini, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 11 days.

(21) Appl. No.: 17/583,490

(22) Filed: Jan. 25, 2022

(65) Prior Publication Data
US 2023/0289792 A1   Sep. 14, 2023

(51) Int. Cl.
| | |
|---|---|
| *G06Q 20/40* | (2012.01) |
| *G06Q 20/32* | (2012.01) |
| *G06Q 20/34* | (2012.01) |
| *G06Q 20/42* | (2012.01) |

(52) U.S. Cl.
CPC ........... *G06Q 20/40* (2013.01); *G06Q 20/326* (2020.05); *G06Q 20/3278* (2013.01); *G06Q 20/354* (2013.01); *G06Q 20/42* (2013.01)

(58) Field of Classification Search
CPC .... G06Q 20/40; G06Q 20/326; G06Q 20/327; G06Q 20/354; G06Q 20/3278; G06Q 20/42
USPC ......................................................... 705/44
See application file for complete search history.

(56) References Cited

U.S. PATENT DOCUMENTS

| | | | |
|---|---|---|---|
| 10,510,072 B2 | 12/2019 | Salama et al. | |
| 10,963,878 B2* | 3/2021 | Lee | ....................... G06Q 20/367 |
| 2010/0312704 A1* | 12/2010 | Rohatgi | .................. G06Q 20/04 |
| | | | 235/494 |
| 2013/0290184 A1* | 10/2013 | Shapiro | ................ G06Q 20/405 |
| | | | 705/44 |
| 2016/0321663 A1* | 11/2016 | Batlle | ................... G06Q 20/405 |
| 2018/0247301 A1* | 8/2018 | Gallo | .................... G06Q 20/342 |
| 2020/0364712 A1* | 11/2020 | Jamison | ............... G06Q 20/351 |

(Continued)

*Primary Examiner* — Hai Tran
(74) *Attorney, Agent, or Firm* — CPST Intellectual Property Inc.; Brett J. Slaney

(57) ABSTRACT

A system and method are provided for authorizing temporary use of accounts. The method is executed by a system and includes detecting that an account holder has selected a payment card to be shared with a recipient, the payment card being associated with an account. The method also includes determining a spending limit for the payment card by the recipient that has been set by the account holder and generating a pending transaction for the payment card with an amount corresponding to the spending limit and against which purchases made by the recipient are deducted. The method also includes providing the recipient with an electronic mechanism to add a temporary payment card to an application on a mobile device associated with the recipient, the temporary payment card being linked to the account to have purchases made using the temporary payment card be applied to that account. The method also includes detecting a purchase made by the recipient using the temporary payment card and modifying the pending transaction details based on the detected purchase.

20 Claims, 14 Drawing Sheets

(56) References Cited

U.S. PATENT DOCUMENTS

2022/0138725 A1\* 5/2022 Sneider ................ G06Q 20/354
705/41

\* cited by examiner

SYSTEM AND METHOD FOR AUTHORIZING TEMPORARY USE OF ACCOUNTS

TECHNICAL FIELD

The following relates generally to authorizing temporary use of accounts.

BACKGROUND

There are situations where a person would prefer to provide a friend, family member or loved one with funds electronically rather than providing cash. For example, that person may want to send their kids shopping or to an attraction with friends or family but does not have cash on hand to give to them for the day.

In another scenario, the person may want to provide a gift using a credit card without paying the fees payable against the amount of the gift if they were to use a credit provider gift card, e.g., just to activate a physical card.

In yet another scenario, the person may want to send a family member to the store to pick up groceries but either does not have cash or does not want to attempt to guess how much cash the family member needs to cover the expected purchase.

Currently, payment cards should not be shared for security and other reasons. Moreover, setting up accounts and payment options for children or other surrogate users that require supervision, limits or other controls can be difficult or may not be available in some instances.

BRIEF DESCRIPTION OF THE DRAWINGS

Embodiments will now be described with reference to the appended drawings wherein.

DETAILED DESCRIPTION

Figure 1:
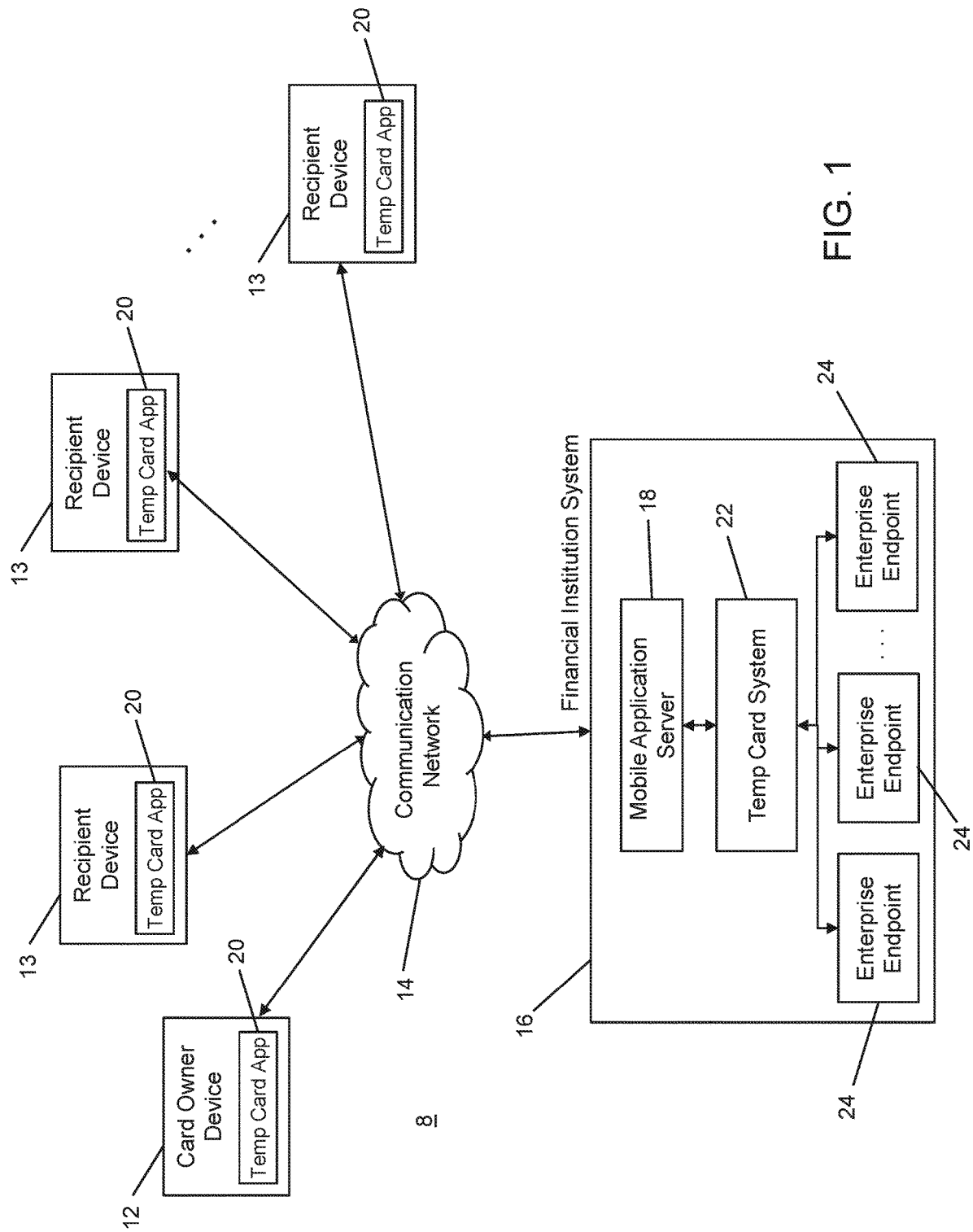
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A temporary (temp) card system is proposed to allow a user (e.g., financial institution customer) to load or otherwise share or provision a virtual payment card to a payment tool or application on a recipient device, for example a child or friend. This can be done using mobile/digital wallet applications such as Apple Pay®, Samsung Pay®, or any other mobile electronic payment mechanism. The card holder can set a total spending limit and, optionally, a time frame that the card can be used. When the spending limit or time limit (or both) has been reached, the card can be removed or otherwise deactivated for the recipient.

The system described herein provides a sharing/transfer workflow to the card holder and recipient device(s), along with a back-end workflow to enable the virtual card to be used by the recipient(s) according to the spending limit and any temporal restrictions placed by the card holder. The sharing/transfer mechanism can be controlled by the card holder such that loading the virtual card can be performed using existing secure transfer mechanisms. For example, the users may be required to physically tap each other's devices, pair using a short range communication protocol such as near field communications (NFC) or Bluetooth; or exchange security codes, tokens, certificates, keys, links or other transfer mechanisms. With the secure transfer/loading having taken place, the recipient can use the virtual card as if they were the card holder, within the limits set. At the backend, the temp card system can create or leverage existing pending transaction mechanisms used at merchants (e.g., gas stations) to permit up to that amount to be applied to the account at the outset to effectively set the upper limit on the funds being spent. The temp card system can map purchases by the virtual card to the pending transaction and update details related to the pending transaction as purchases are made, e.g., to track an amount remaining to be used. The temp card system can impose an expiry date or time duration or limit (in addition to a spending limit) such that if the funds are not spent within a certain amount of time or by a certain date, the virtual card expires and is removed from the application. This can be done automatically and transparently to the recipient while being controlled by the card holder and the temp card system.

Existing notification channels can also be used to allow the recipient to request, and the card holder to accept or deny, an increase in the spending limit, or an extension to the time limit. These channels can also be used to enable the card holder to cancel the virtual card or permit the spending limit to be transferred to a new device (e.g., from one child to another) or to be shared amongst multiple recipients.

The card holder can select an option to create a temporary card from an existing mobile banking app or a browser-based equivalent, set the amount and expiry date, and identify the recipient (including a communication address). Once the virtual card has been created, the card holder has a pending transaction in their list of transactions until the funds are used or the time limit is reached. By using a pending transaction, the card holder can set aside the funds they are transferring to ensure credit limits or spending budgets are not exceeded.

Certain example systems and methods described herein are able to enable account and card holders to authorize recipients to temporarily use a card within one or more limits placed on the temporary card. In one aspect, there is provided a system for authorizing temporary use of accounts. The system includes a processor, a communications module coupled to the processor, and a memory coupled to the processor. The memory stores computer executable instructions that when executed by the processor cause the processor to detect that an account holder has selected a payment card to be shared with a recipient, the payment card being associated with an account. The memory also stores computer executable instructions that when executed by the processor cause the processor to determine a spending limit for the payment card by the recipient that has been set by the account holder and generate a pending transaction for the payment card with an amount corresponding to the spending limit and against which purchases made by the recipient are deducted. The memory also stores computer executable instructions that when executed by the processor cause the processor to provide the recipient with an electronic mechanism to add a temporary payment card to an application on a mobile device associated with the recipient, the temporary payment card being linked to the account to have purchases made using the temporary payment card be applied to that account. The memory also stores computer executable instructions that when executed by the processor cause the processor to detect a purchase made by the recipient using the temporary payment card; and modify the pending transaction details based on the detected purchase.

In another aspect, there is provided a method of authorizing temporary use of accounts. The method is executed by a system and includes detecting that an account holder has selected a payment card to be shared with a recipient, the payment card being associated with an account. The method also includes determining a spending limit for the payment card by the recipient that has been set by the account holder and generating a pending transaction for the payment card with an amount corresponding to the spending limit and against which purchases made by the recipient are deducted. The method also includes providing the recipient with an electronic mechanism to add a temporary payment card to an application on a mobile device associated with the recipient, the temporary payment card being linked to the account to have purchases made using the temporary payment card be applied to that account. The method also includes detecting a purchase made by the recipient using the temporary payment card and modifying the pending transaction details based on the detected purchase.

In another aspect, there is provided a non-transitory computer readable medium for authorizing temporary use of accounts. The computer readable medium includes computer executable instructions for detecting that an account holder has selected a payment card to be shared with a recipient, the payment card being associated with an account. The computer readable medium also includes computer executable instructions for determining a spending limit for the payment card by the recipient that has been set by the account holder and generating a pending transaction for the payment card with an amount corresponding to the spending limit and against which purchases made by the recipient are deducted. The computer readable medium also includes computer executable instructions for providing the recipient with an electronic mechanism to add a temporary payment card to an application on a mobile device associated with the recipient, the temporary payment card being linked to the account to have purchases made using the temporary payment card be applied to that account. The computer readable medium also includes computer executable instructions for detecting a purchase made by the recipient using the temporary payment card and modifying the pending transaction details based on the detected purchase.

In certain example embodiments, the system can detect that a time limit for using the temporary payment card has been set by the account holder after which the temporary payment card can no longer be used by the recipient and initiate an inactivation of the temporary payment card after reaching the time limit.

In certain example embodiments, the temporary payment card can be inactivated on the mobile device when the pending transaction amount has been used.

In certain example embodiments, the system can detect a request by the recipient to increase the pending transaction amount and send the request to the account holder and provide an option to increase the transaction amount or deny the request.

In certain example embodiments, the system can detect a request by the recipient to extend the time limit; and send the request to the account holder and provide an option to extend the time limit or deny the request.

In certain example embodiments, the system can provide a temporary card user interface to the account holder and detect selection of the payment card via the user interface. The temporary card user interface can be provided as an option within a mobile banking application, the mobile banking application being available via an app or a browser. The temporary card user interface can also be provided as a standalone app having access to a mobile banking application.

In certain example embodiments, the system can detect a request to transfer the temporary card to a secondary recipient, obtain approval of the request to transfer from the account holder, and enable the electronic mechanism to be utilized by the secondary recipient to transfer the temporary card. The electronic mechanism can be provided between the mobile device of the recipient and a secondary mobile device used by the secondary recipient.

In certain example embodiments, the electronic mechanism can include a link sent by the card holder to the other party via an electronic communication channel.

In certain example embodiments, the electronic mechanism can include a near-field pairing process initiated by an account holder device or the mobile device used by the recipient.

FIG. 1 illustrates an exemplary computing environment 8. In one aspect, the computing environment 8 may include a financial institution system 16 having a temporary (temp) card system 22, one or more client devices 12, 13 and a communications network 14 connecting one or more components of the computing environment 8. In this example, the client devices 12, 13 can include and be referred to as card owner devices 12 and recipient devices 13. It can be appreciated that a card owner device 12 can also be a recipient device 13 in certain scenarios and the depiction provided in FIG. 1 is an illustrative snapshot of the environment 8 having a card owner device 12 and a plurality of recipient devices 13.

The financial institution system 16 may be associated with a financial institution (e.g., for a commercial bank) that provides financial services accounts to users and processes financial transactions associated with those financial service accounts. This can include providing banking, loyalty, customer service, and other financial-related options via a mobile application (app) 26 or browser 28 (see also FIG. 2) that can be downloaded to and used by users of the client devices 12, 13. The devices 12, 13 in this example also include a temp card app 20, which is shown separately from a mobile banking app 26 or browser 28 for illustrative purposes, but could also be a module or feature built into same.

The financial institution system 16 includes a mobile application server 18 used to serve the temp card app 20 and mobile banking app 26 and the temp card system 22 provides an interactive layer between the mobile application server 18 and one or more enterprise endpoints 24, which can each be associated with a department, line of business, service or other entity or sub-entity within or associated with the financial institution system 16. For example, in the financial institution system 16, one enterprise endpoint 24 can be associated with everyday banking while another endpoint 24 can be associated with credit accounts (e.g., debit or credit cards as exemplified herein) or investment accounts, mortgages, insurance, etc. While several details of the financial institution system 16 have been omitted for clarity of illustration, reference will be made to FIG. 13 below for additional details.

Client devices 12, 13 may be associated with one or more users. Users may be referred to herein as customers, clients, correspondents, agents, or other entities that interact with the financial institution system 16 and/or temp card system 22 (directly or indirectly). This can include card and/or account holders or customers of the financial institution system 16 (who utilize what is referred to herein as a card owner or card holder device 12) as well as entities receiving temporary access to accounts of the account holders, which may or may not be customers of the financial institution system 16 and are referred to generally herein as "recipients" who are associated with electronic recipient devices 13. The computing environment 8 may include multiple client devices 12, 13, each client device 12, 13 being associated with a separate user or being associated with one or more users. In certain embodiments, a user may operate client device 12, 13 such that client device 12, 13 performs one or more processes consistent with the disclosed embodiments. For example, the user may use card owner device 12 to engage and interface with a mobile or web-based banking application (i.e., the mobile banking app 28) and temp card app 20, which permits the temp card system 22 to enable temporary use of a payment card (e.g., debit, credit, etc.) by a recipient device 13. In certain aspects, client device 12, 13, can include, but is not limited to, a personal computer, a laptop computer, a tablet computer, a notebook computer, a handheld computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12, 13. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, temp card system 22 may be one or more computer systems (e.g., server devices) configured to process and store information and execute software instructions to perform one or more processes consistent with the disclosed embodiments. In certain embodiments, although not required, temp card system 22 may be associated with one or more business entities. In certain embodiments, the temp card system 22 may represent or be part of any type of business entity. For example, temp card system 22 may be a system associated with a commercial bank (e.g., financial institution system 16), a retailer, utility, government entity, educational institution, or some other type of business. The temp card system 22 can also operate as a standalone entity that is configured to serve multiple business entities, e.g., to act as an agent therefor.

Continuing with FIG. 1, the temp card system 22 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the temp card system 22 and financial institution system 16. The cryptographic server may be used to protect sensitive data (e.g., financial data) and/or client data 40 and/or mobile app data 36 and/or temp card limits 38 stored in another datastore (see, e.g., FIG. 3), by way of encryption for data protection, digital signatures or message digests for data integrity, and by using digital certificates to authenticate the identity of the users and client devices 12, 13, with which the financial institution system 16 and/or temp card system 22 communicates to inhibit data breaches by adversaries. It can be appreciated that various cryptographic mechanisms and protocols can be chosen and implemented to suit the constraints and requirements of the particular deployment of the temp card system 22 or financial institution system 16 as is known in the art.

Figure 2:
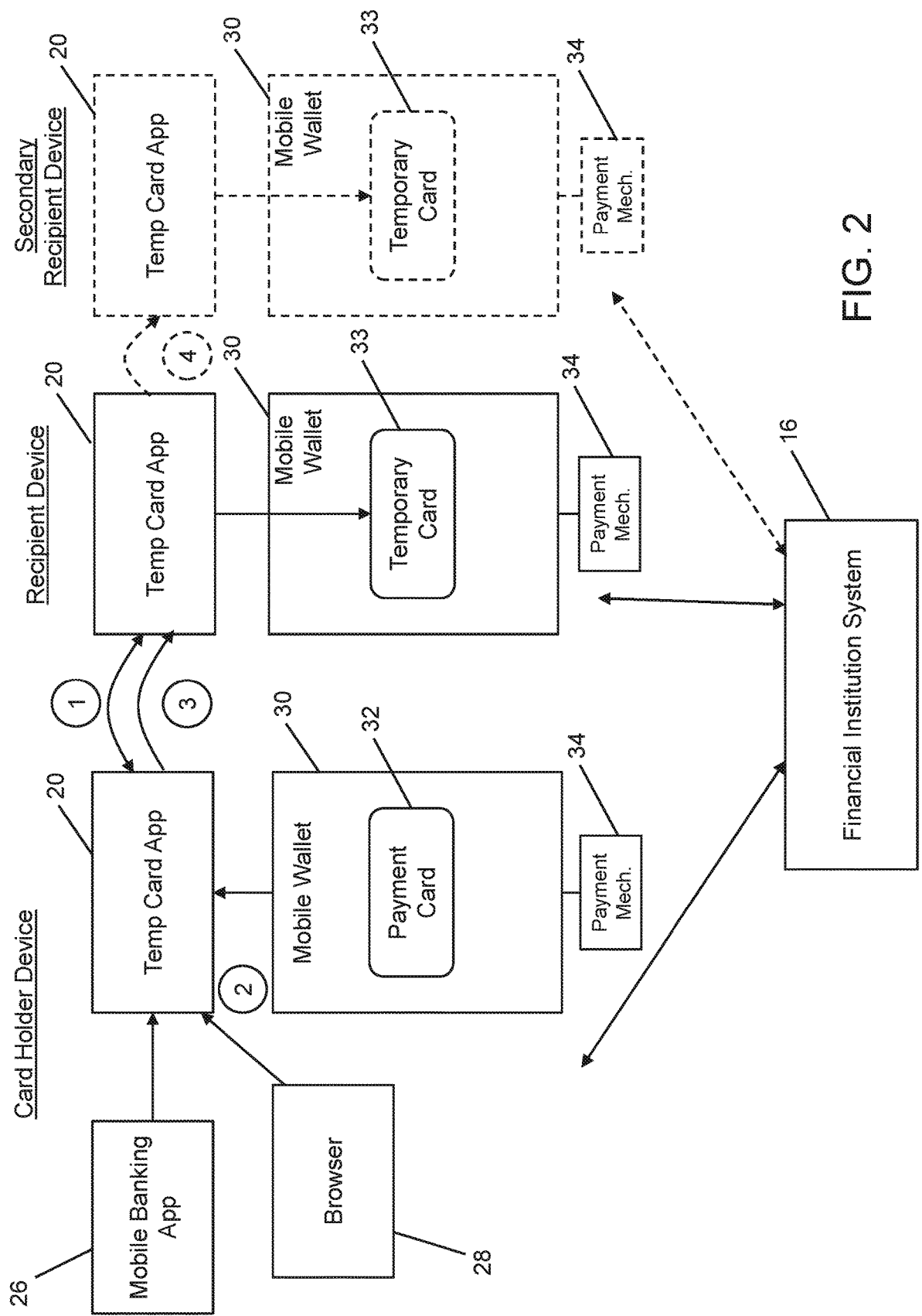
FIG. 2 is a schematic diagram illustrating communications between a card holder device and one or more recipient devices to share a temporary card associated with an account of the card holder.

FIG. 2 illustrates a scenario depicting a transfer of funds from a card holder device 12 to one or more recipient devices 13 using the temp card app 20 in which the recipient device(s) 13 is/are able to utilize those funds by having temporary access to a payment card for an account associated with a user of the card holder device 12. In this example, a user of the card holder device 12 interacts with a mobile banking app 26, a mobile banking application via the browser 28 or the temp card app 20 itself directly to initiate a pairing or other communication connection process at stage 1 to enable the temp card app 20 of the card holder device 12 to securely initiate a transfer. The pairing or connection process at stage 1 can utilize any suitable communication channel. Examples of such communication channels include, without limitation, Bluetooth, WiFi, infrared, near field communication (NFC), SMS text messaging, email, etc. These communication channels can utilize secure links, keys, tokens or other secure mechanisms to enable the card holder device 12 to verify that it is communicating with the intended recipient device 13. This can include proximity pairing such as tapping devices or confirming codes on respective display screens. One time codes sent via one or more channels can also be used to establish multi-factor authentication. It can be appreciated that the pairing process in stage 1 can be required each time the temp card app 20 is being used or can be performed as a single initiation stage prior to allowing subsequent temp card transactions between card holder and recipient devices 12, 13.

The card holder device 12 in this example includes a mobile wallet 30, which stores one or more virtual payment "cards" 32 which can enable the card holder device 12 to utilize a payment mechanism 34 (e.g., NFC tapping, etc.) to make in-store payments at point-of-sale (POS) terminals as well as through online merchants. In stage 2 depicted in FIG. 2, the temp card app 20 accesses or otherwise obtains a payment card 32 that is to be shared with one or more recipient devices 12. For example, the card holder device 12 may be associated with a parent that is using the temp card app 20 to provide a limited amount of funds to a child or friend to effectively "use my card". Having paired the card holder device 12 with a first recipient device 13 (shown in solid lines in FIG. 2), the temp card app 20 on the card holder device 12 can initiate a transfer of data and information in stage 3, sufficient to enable a temp card app 20 on the recipient device 20 to load a temporary card 33 in a mobile wallet 30 of the recipient device 13. In the example shown in FIG. 2, the recipient device(s) 13 include the same temp card app 20 and mobile wallet 30 as the card holder device 12 for ease of illustration. It can be appreciated that the exchange in stage 3 or the pairing in stage 1 can include steps to either initiate a download or provisioning of the recipient device 13 to acquire such capabilities or can apply a retrofitting or compatibility process to allow credentials in one domain to be useable in another domain. For example, users of one mobile operating system may need a conversion, patch, or adaptation to take place to ensure payment mechanisms 34 in another operating system can function.

Also shown in dashed lines in FIG. 2 are a fourth stage and a secondary recipient device 13. As discussed above, the card holder device 12 may wish to share funds with multiple recipients and/or a first recipient may wish to share a portion of or transfer all or a portion of the funds allotted to them to a second recipient. For example, one child may obtain the initial transfer in stage 3 but subsequently need to transfer at least a portion of the funds to a second child while out at an attraction or event. Similarly, one child may leave early but wish to leave behind the remaining funds to a sibling. In any such scenario, the original or first recipient device 13 (shown in solid lines in FIG. 2) can initiate or participate in the transfer at stage 4. For example, the card holder device 12 can provide permission to the recipient device 13 to enable them to use their temp card app 20 to transfer the portion or remaining funds as well as any data and information required to use same. This can be done using a direct recipient-to-recipient transfer as illustrate in FIG. 2 or by handing off such a responsibility back to the card holder device 12. For example, the first recipient device 13 could request that the card holder device 12 approve of the sharing or subsequent transfer and have stage 4 performed directly between the card holder device 12 and the secondary recipient device 13 as was done in stage 3. This may require stage 1 being performed between such devices if the pairing has not yet occurred or credentials are expired or stale.

It can be seen from the illustration in FIG. 2 that the temp card app 20, whether as a standalone app as shown, or as part of a mobile banking app 26 or application accessible via a browser 28, can enable devices 12, 13 to coordinate and effect the transfer of funds from a card holder account to one or more recipients by issuing temporary cards 33. While the temporary cards 33 are shown as being stored by and utilized from mobile wallets 30 any equivalent storage and usage mechanism can be applied to enable the recipient devices 13 to utilize either the onboard payment mechanism(s) 34 or other channels such as a network exchange or submission of credentials via a mobile merchant app (not shown) or browser 28.

The card holder and recipient devices 12, 13 can also be in communication with the financial institution system 16 as shown in FIG. 2, to update the backend systems associated with payment and credit cards used to create the temporary cards 33 as discussed below. This enables the temp card app 20 to coordinate with the mobile application server 18 and temp card system 22 to have the appropriate enterprise endpoints 24 (e.g., debit or credit card departments) instructed to assign pending transactions that correspond to the spending limits. Moreover, this coordination enables the temp card system 22 to create and enforce time limits and to eliminate the ability to use the temporary cards 33 according to such spending and time limits. Alternatively, the temp card app 20 can enforce the spending and time limits, however, the temp card system 22 can be used to ensure coordination and normalization between what is capable at the device front end (e.g., at a merchant) and what is permitted by the backend systems as dictated by the card and account holder associated with the card holder device 12.

Figure 3:
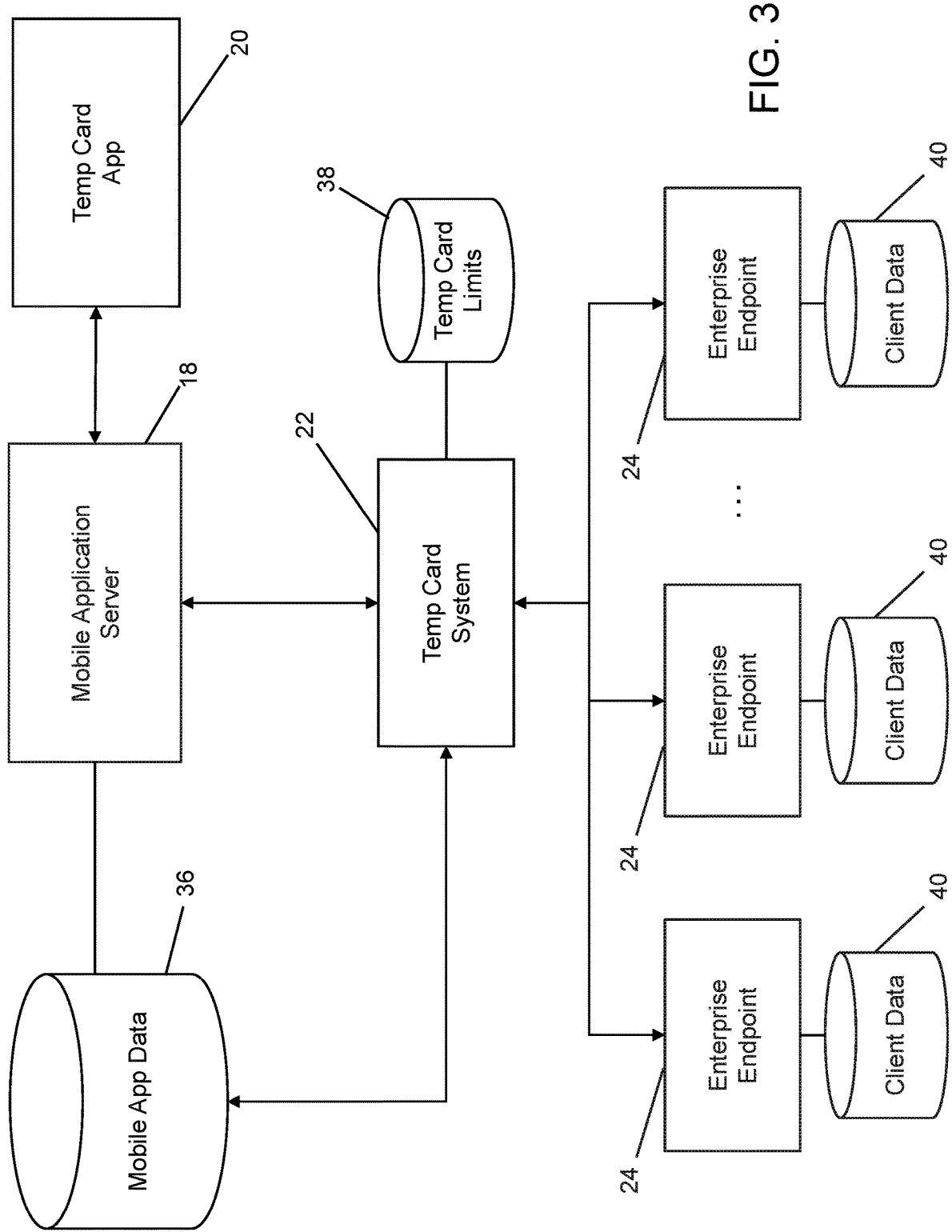
FIG. 3 is a schematic diagram of a temp card system coupled to multiple enterprise endpoints and a mobile application server to coordinate the creation and expiration of temporary cards to be shared between users.

Referring now to FIG. 3, the temp card system 22 is shown as coupled to various components, entities, and services of, or associated with, the financial institution system 16 and temp card app 20 whether the temp card system 22 is integrated into the financial institution system 16 or provided separately as a service therefor. The temp card system 22 is positioned and operable between the mobile application server 18 and, in this example, a number of enterprise endpoints 24 to coordinate and deliver data and information between the temp card app 20 and enterprise endpoints 24 that are associated with products, services, or features responsible for or otherwise related to the transfer of funds into a temporary card 33 as described herein. For example, the temp card system 22 can instruct a debit or credit account system (at or utilizing one or more endpoints 24) to generate a pending transaction in a user's account that is equal to the spending limit on the temporary card 33. In this way, the backend systems can allocate the shared or gifted funds and ensure that overages are not incurred without prior approval. A pending transaction or equivalent tracking mechanism is used to effectively pre-approve the amount being allocated to the temporary card 33 to avoid going over a credit limit or into an overdraft scenario. If not all of the funds are spent during the time period for which the temporary card 33 is active, the pending transaction can be resolved to reapply funds back to the account, akin to pending limits set at fuel pumps or deposits placed on hotel rooms or other rentals.

In this example, each enterprise endpoint 24 includes or has access to client data 40 associated with one or more accounts for users of client devices 12, 13 running the temp card app 20, mobile banking app 26 or any application served via a browser 28. However, it can be appreciated that multiple endpoints 24 can have access to the same client data 40 in other configurations.

The mobile application server 18 includes or otherwise has access to a datastore for storing mobile app data 36, which can include data also stored as client data 40 by an enterprise endpoint 24 and/or provide a cache for same. The data 36, 40 may include any information or content, such as account data, personal data, conversation scripts or other contextual data (e.g., from call center interactions), metadata, tags, notes, files (e.g., PDFs), links (e.g., uniform resource locators (URLs)), images, videos, etc. that are created from or otherwise relate to interactions (e.g., conversations) between entities in the computing environment 8, in particular those made using client devices 12, 13 via one or more communication channels available via the communication network 14 or other communication networks 14. As such, the data 36, 40 can be used by the temp card system 22 in performing operations such as those described herein. The client data 40 may include both data associated with a user of a client device 12, 13 that interacts with the financial institution system 16 and temp card app 20 (e.g., for participating in mobile banking and creating temporary cards 33 for others) and transaction history data that is captured and provided with a transaction entry, e.g., in the graphical user interface of a mobile or web-based banking application. The data associated with a user can include client profile data that may be mapped to corresponding financial data for that user and/or may include some of the financial data. Client profile data can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client profile data may also include historical interactions and transactions associated with the financial institution system 16, e.g., login history, search history, communication logs, metadata, files, documents, etc.

It can be appreciated that the datastores used to store client data 40 and mobile app data 36 are shown as separate components from the enterprise endpoints 24 and mobile application server 18/financial institution system 16 for illustrative purposes only and may also be at least partially stored within a database, memory, or portion thereof within the financial institution system 16.

The temp card system 22 includes or has access to a database or other datastore containing temp card limits 38, which can be used by the temp card system 22 to track time limits associated with various temporary cards 33 as well as enable client devices 12, 13 to request and being granted or denied extensions to the time limits as described in greater detail below.

By integrating or coupling the temp card system 22 to multiple enterprise endpoints 24 in the financial institution system 16, the temp card system 22 can coordinate between the temp card apps 20 and the appropriate enterprise endpoints 24 to have pending transactions created to account for the shared or gifted funds.

Figure 4:
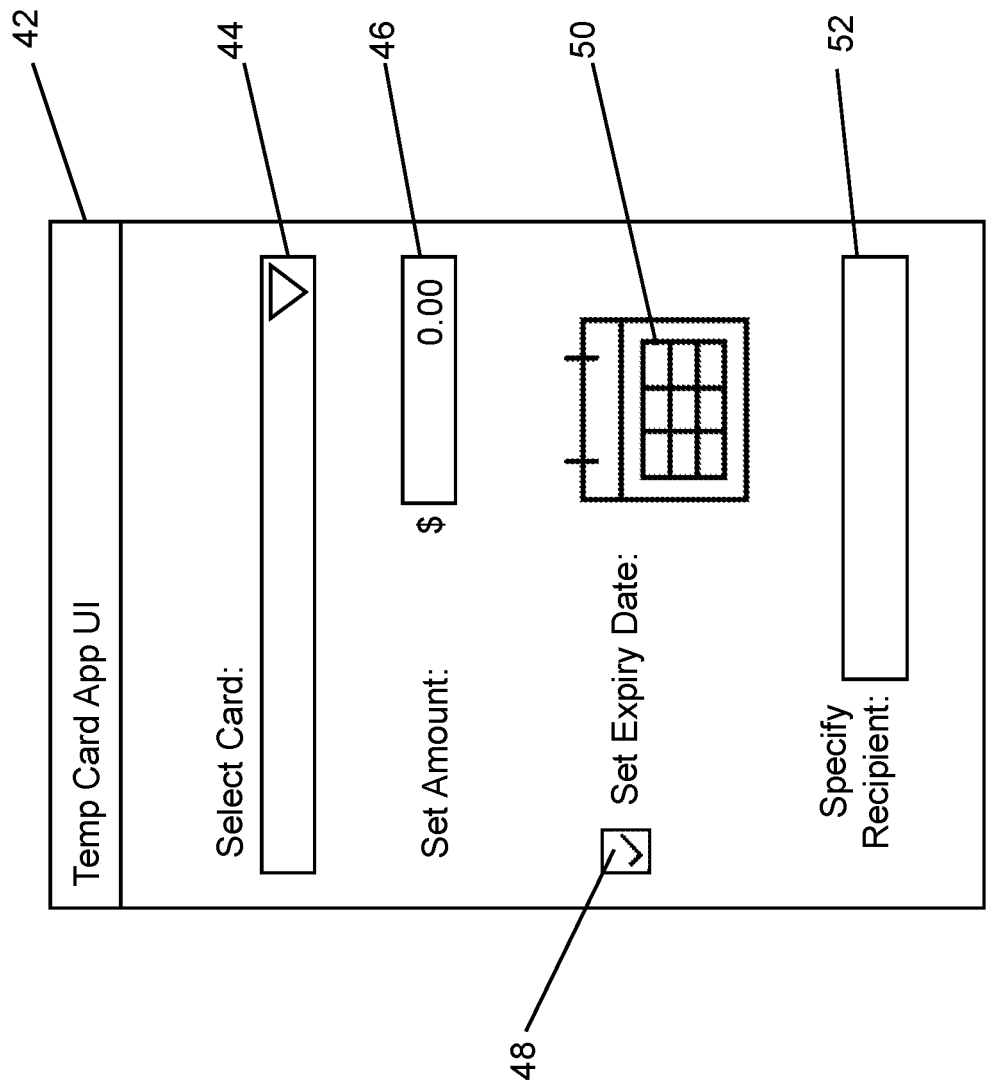
FIG. 4 is an example of a graphical user interface for entering temp card settings.

Referring now to FIG. 4 an example of a temp card user interface (UI) 42 is shown, which can be used by or with the temp card app 20 (and/or temp card system 22 via some other channel) to create a temporary card 33 for one or more recipient devices 13. In this example, the temp card UI 42 enables a user of the card holder device 12 to select various parameters associated with the temporary card 33. This can include a card selection drop down menu 44 as shown, which enables the temp card app 20 to pre-populate available accounts for which a temporary card 33 can be created. The pre-population can also embed intelligence to filter out cards that may not have sufficient funds or do not have permissions sufficient to enable a temporary card 33 to be created. For example, certain financial products may not allow account holders to generate a temporary card 33 for regulatory, technical or other policy-related reasons, and the temp card app 20 can make such determinations and populate the drop down menu 44 accordingly. The temp card UI 42 also includes a card amount entry box 46 to enable the account and card holder to set the amount they wish to authorize for the temporary card 33. Similarly, in this example a check box 48 can be used to optionally set an expiry date for the funds specified in the entry box 46, e.g., using a calendar selector 50 as shown. It can be appreciated that rather than an expiry date, the time limit can be based on a duration such as a number of hours, a number of days, a number of weeks, etc. regardless of specific days of the week or month.

Also shown in FIG. 4 is an entry or selection box 52 for specifying one or more recipients. This can provide a drop-down menu of pre-approved recipients or enable the card holder to specify a contact email or phone number (to send a text message) or to initiate a pairing in real-time. For example, the selection box 52 can provide an option to simply "tap to pair" such that the card holder can quickly transfer to a recipient without a lengthier pairing process. The selection box 52 can also provide the ability to specify multiple recipients and can even enable the card holder to designate additional recipients that the main recipient can share the funds with (e.g., as shown in FIG. 2). In this way, the temp card app UI 42 can be used to preemptively set up parameters associated with the temporary card 33. Other settings such as who can be permitted to create secondary temporary cards 33 can be set, for example, the primary or first recipient or the card holder.

In the example shown in FIG. 4, the amount set in the entry box 46 can be representative of an overall amount that is available to be split over any number of multiple recipients or can represent an amount per recipient. That is, the UI 42 shown in FIG. 4 can be modified or have additional screens, tabs or versions to show other modifiable options described herein but not necessarily shown in FIG. 4. It is appreciated that the temp card app UI 42 can be adapted to any of the embodiments, features, and scenarios described herein and should not be limited to what is illustrated in FIG. 4.

Figure 5:
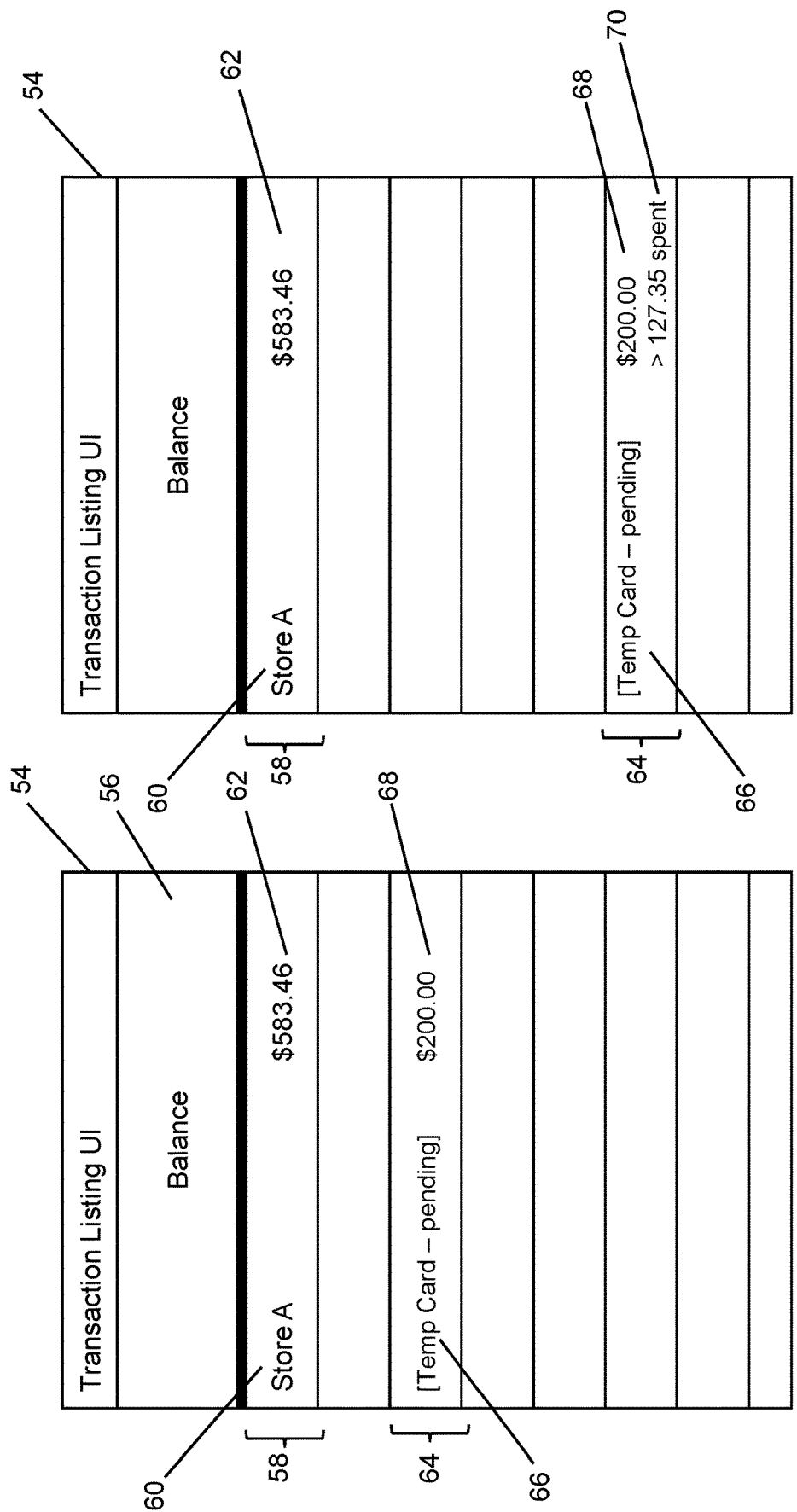
FIG. 5A is an example of a graphical user interface for a transaction listing user interface showing a pending transaction against an account that corresponds to a temp card spending limit.
FIG. 5B is an example of a graphical user interface for a transaction listing user interface showing updated details associated with the pending transaction shown in FIG. 5A.

Referring now to FIGS. 5A and 5B, a transaction listing UI 54 is shown to illustrate how the issuance of a temporary card 33 can be depicted to the card holder, for example, via the mobile banking app 26 or browser 28 or via any other UI element utilized to visualize transactional data. Referring first to FIG. 5A, the transaction listing UI 54 in this example, includes a balance header portion 56 that provides an account balance for the associated account/card. The UI 54 also includes a number of transaction listings 58, each providing identifying information 60 of the merchant and an amount 62. Within the listings 58, a temp card pending transaction 64 is shown. The pending transaction 64 can include a distinguishable identifier 66 such as square brackets in this example, a different color, etc. Also shown in the pending transaction is the amount 68, which corresponds to the upper limit provided to the temporary card 33, which can be used by one or more recipient devices 13 as described above.

As shown in FIG. 5B, as funds are spent by the temporary card 33, the pending transaction 64 can be updated both visually within the listing and spatially by moving the transaction 64 down the list as shown. In this way, the user can be aware of how much is spent, how much remains, and how recent the temporary card 33 has been used, if at all. Tracking these parameters at the back end enables the temp card system 22 to determine if any leftover funds can be applied back to the account. The card holder can also determine if additional funds may be needed and how they have been spent, in the event the recipient requests more and/or the card holder permits same whether initiated by the card holder or the recipient as described in detail below.

Figure 6:
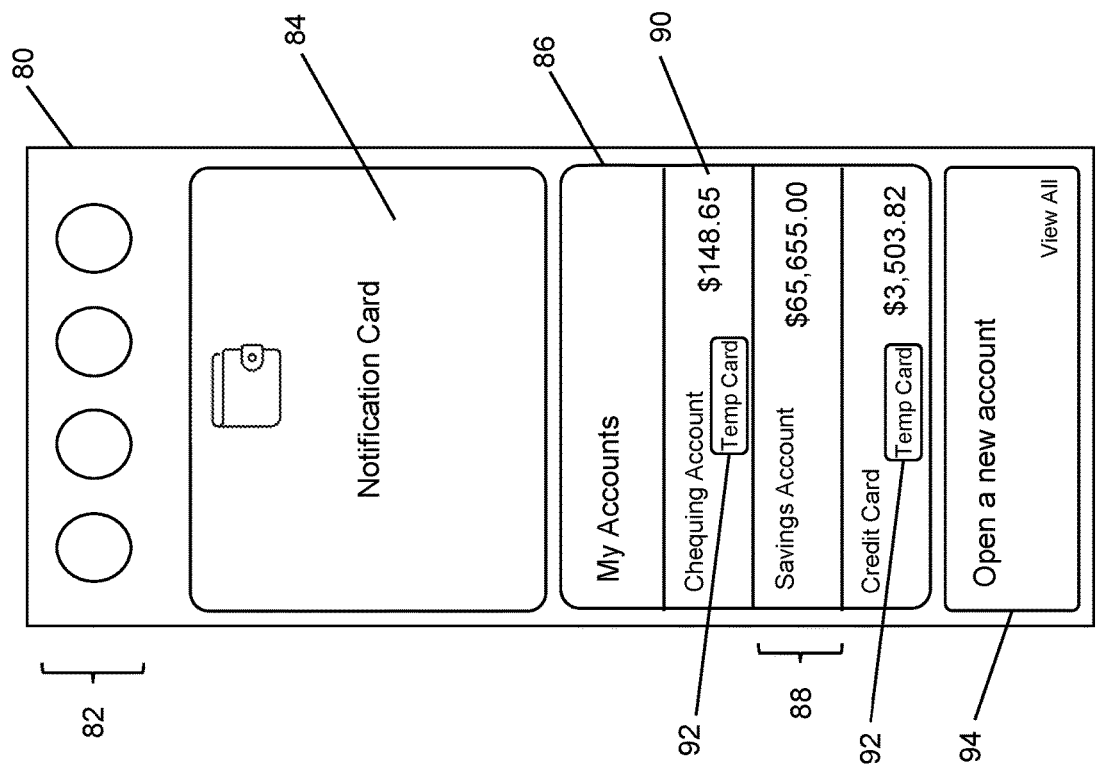
FIG. 6 is an example of a graphical user interface for an accounts user interface in a mobile banking app with an option to create a temporary card for certain accounts.

The temp card UI 42 shown in FIG. 4 can be a standalone UI provided by, for example, the temp card app 20, or can be accessed or launched from elsewhere, such as within a mobile banking application 26 or application accessed via a browser 28. A mobile banking accounts UI 80 is shown in FIG. 6. The mobile app UI 80 includes a banner portion 82 providing a number of options, a notification card 84, an accounts portion 86, and an "Open a new account" portion 94 which is an example of another portion of the mobile app UI 80 that can be scrolled to or otherwise accessed.

The notification card 84 in this example is positioned at or near the top of the mobile app UI 80 to be more noticeable to the user. The accounts portion 86 includes a listing 88 for each account associated with the financial institution, in this example a chequing account, a savings account, and a credit card, each having a balance 90 indicated in the respective listing. Also shown in FIG. 6 is a temp card icon 92, which can be placed within an account listing 88 as shown or elsewhere in the mobile app UI 80 to enable users to launch the temp card UI 42 from their existing mobile banking application 26. In this example the icon 92 is shown only in the accounts for which funds can be extracted for a temporary card 33, however, other mechanisms can be used to identify available accounts/cards that can be used. In this example, it may be assumed that the savings account is not permitted to be used or is not associated with a payment card. Other restrictions or policy considerations could also be in place.

Figure 7:
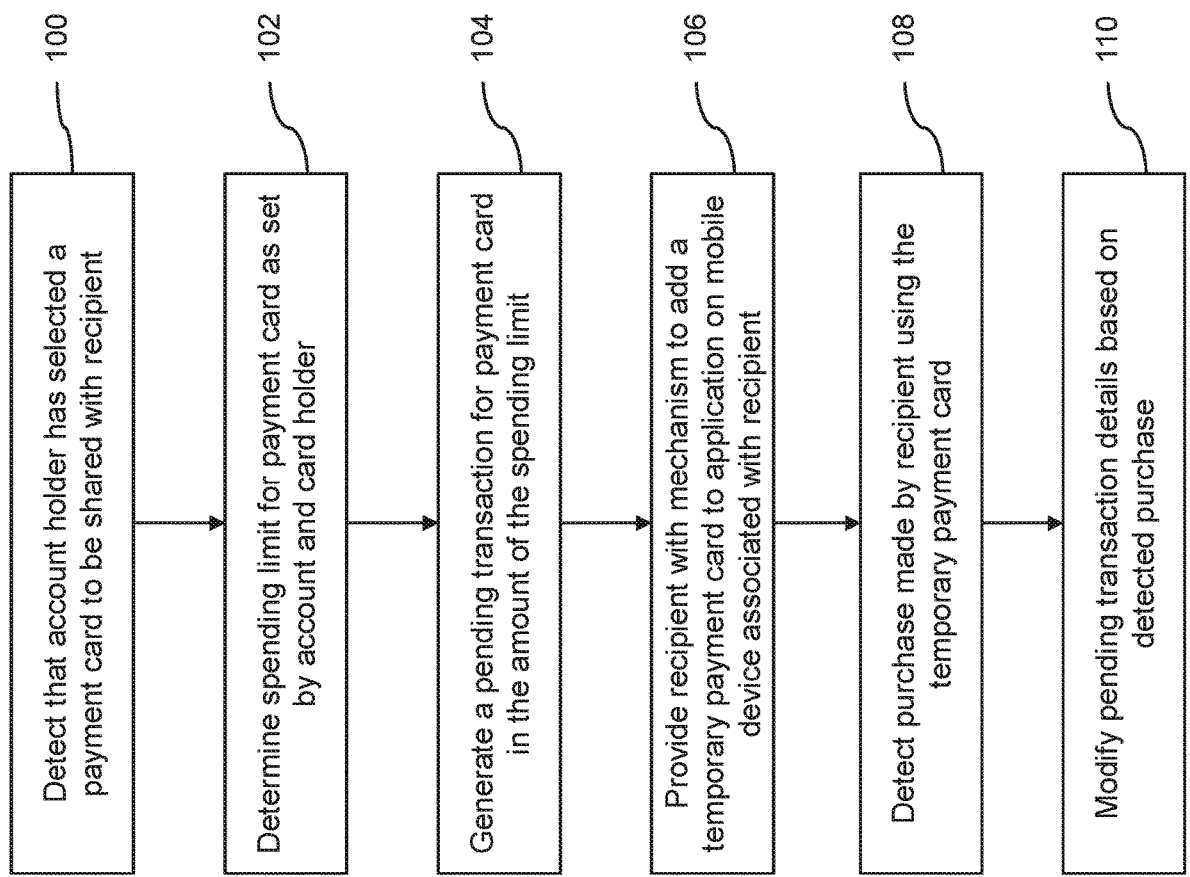
FIG. 7 is a flow diagram of an example of computer executable instructions for authorizing temporary use of accounts.

Referring now to FIG. 7, an example embodiment of computer executable instructions for authorizing temporary use of accounts is shown. At block 100, the temp card system 22 (or the temp card app 20 on behalf of the temp card system 22) detects that an account holder (e.g., user of card holder device 12) has selected a payment card 32 to be shared with at least one recipient (e.g., user of recipient device(s) 13). At block 102, the temp card system 22 determines a spending limit for the payment card as set by the account/card holder, e.g., via the temp card app UI 42. The temp card system 22 then generates a pending transaction (or equivalent mechanism to hold or allocate funds to be spent) for the selected payment card in the amount of the spending limit. At block 106, the temp card system 22 provides a mechanism to add the temporary payment card 33 to an application on the recipient mobile device 13, e.g., by enabling the recipient to store the temporary card 33 in a mobile wallet 30 as illustrated in FIG. 2. The temp card system 22 can then detect a purchase made by a recipient using the temporary payment card 33 at block 108 and modify the associated pending transaction details based on the detected purchase, e.g., by updating the transaction 64 as illustrated in FIG. 5B to show an updated amount spent at 70.

Figure 8:
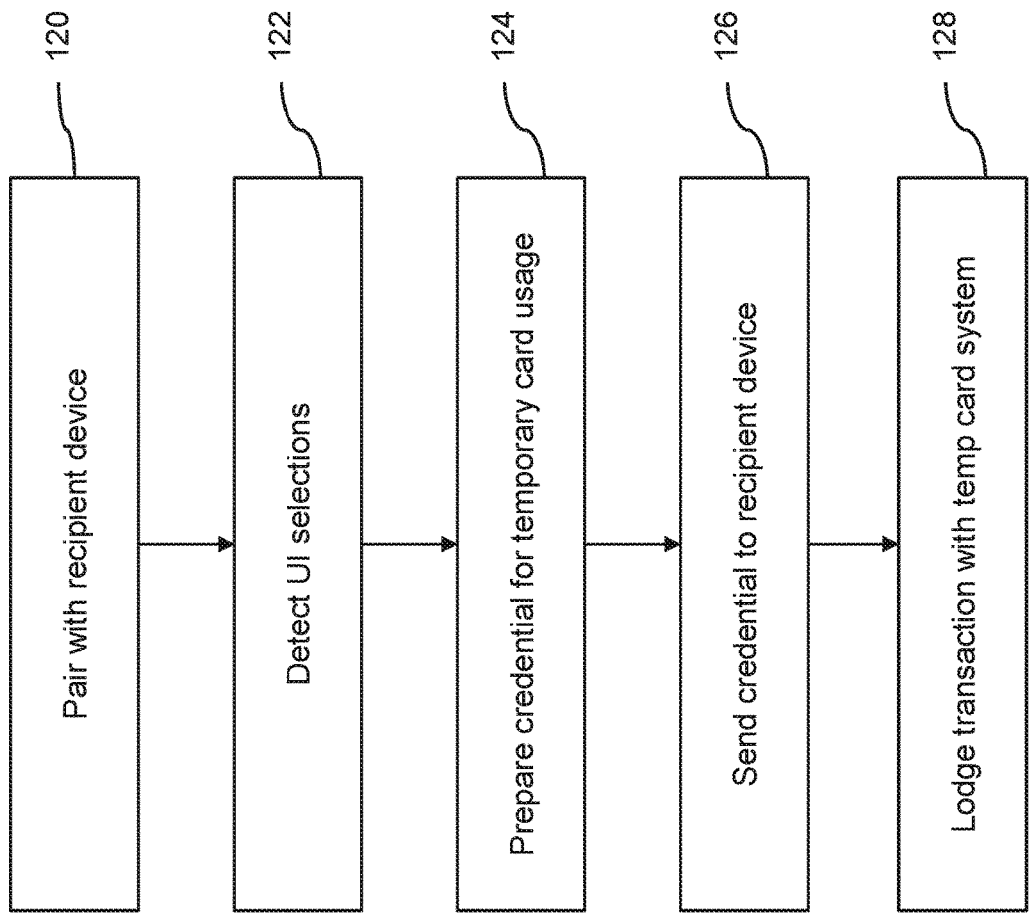
FIG. 8 is a flow diagram of an example of computer executable instructions for preparing and sending a credential to a recipient device for temporary card use.

Referring to FIG. 8, an example embodiment of computer executable instructions for preparing and sending a credential to a recipient device for temporary card use is shown. At block 120, the card holder device 12 pairs with a recipient device 13, e.g., in stage 1 as shown in FIG. 2. At block 122, the temp card app 20 or temp card system 22 via the temp card app 20 detects the UI selections made, for example, via the UI 42 shown in FIG. 4. The temp card app 20 prepares (or receives from the temp card system 22) a credential for temporary card usage at block 124, that is, to generate a temporary card 33 for or at the recipient device 13. The credential can be sent at block 126, e.g., via the exchange shown in stage 3 in FIG. 2. As discussed above, the credential can represent any data or information permitting the temp card app 20 of the recipient device 13 to create an authentic temporary card 33. The temp card app 20 of the card holder and/or recipient devices 12, 13 can lodge the transaction with the temp card system 22 at block 128, e.g., to enable the pending transaction to be generated in the backend system(s).

Figure 9:
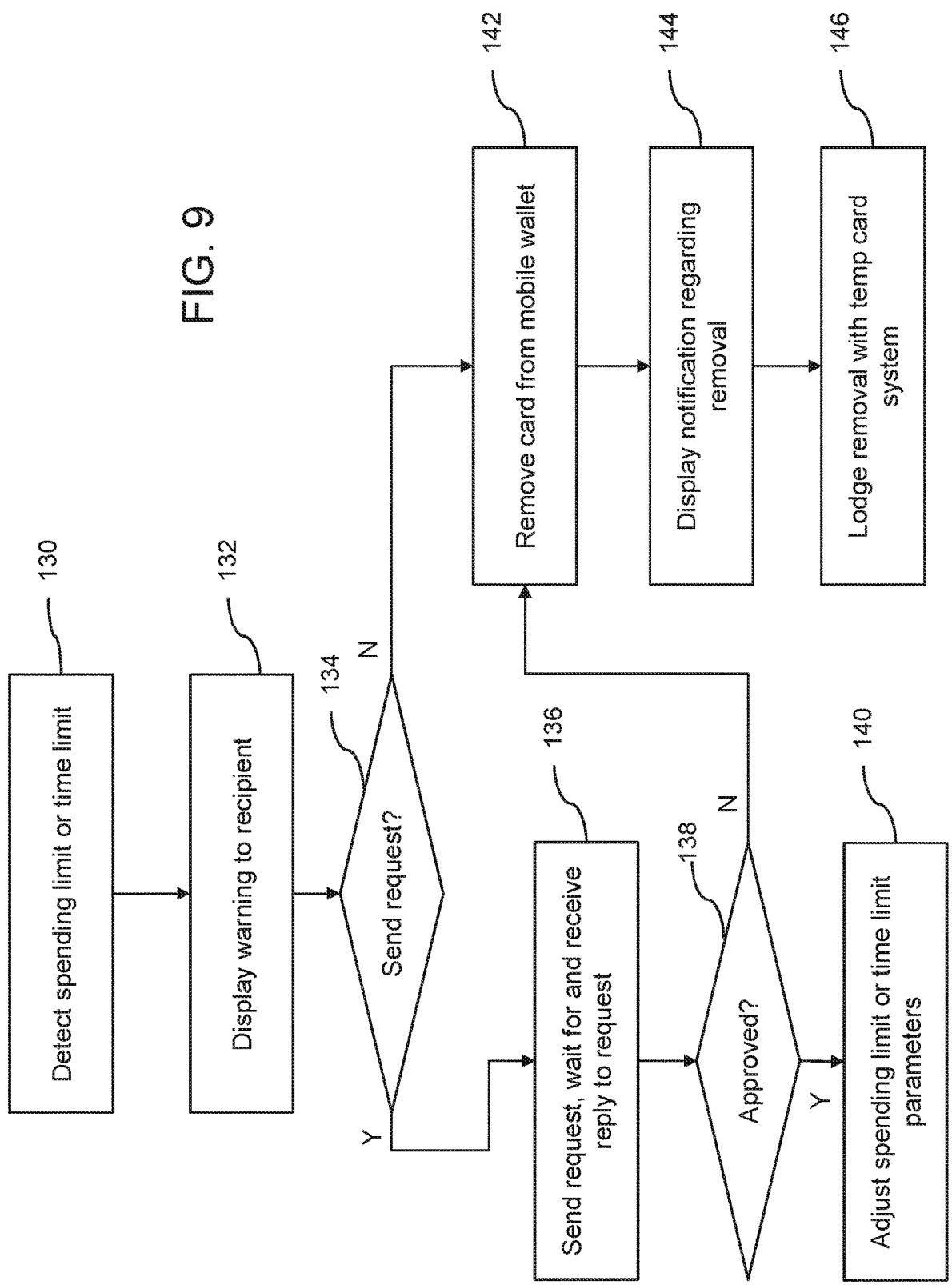
FIG. 9 is a flow diagram of an example of computer executable instructions for handling events related to reaching a spending limit or time limit for a temporary card.

Referring now to FIG. 9, an example embodiment of computer executable instructions for handling events related to reaching a spending limit or time limit for a temporary card is shown. At block 130, the temp card app 20 and/or temp card system 22 detects that a spending limit or time limit for spending the funds has been reached or will soon be reached. For example, the detection at block 130 can be made as a threshold percentage or amount is reached (e.g., 95% of funds, 1 day or X number of hours prior to time limit, etc.). By detecting according to such threshold(s) a warning can be displayed to the recipient at block 132, e.g., an electronic notification via the temp card app 20 or mobile banking app 26, etc. The warning can include an option to request more funds or a time limit extension and, at block 134, the temp card app 20 can determine if a request for same has been selected. If so, the request can be sent to the card holder device 12 at block 136 and the temp card app 20 can wait to receive a reply to the request. At block 138 the temp card app 20 determines if the request has been approved. If so, the spending limit or time limit parameters are adjusted at block 140, which can include coordination between the temp card system 22 and the respective temp card app 20.

If the request is denied and/or a request is not sent to begin with, the temporary card 33 is removed from the mobile wallet 30 at block 142 (or from any other storage mechanism being used for the temporary card 33). At block 144, the temp card app 20 can display a notification concerning the removal of the temporary card 33, e.g., via the recipient and/or card holder devices 13, 12. At block 146, the removal of the temporary card 33 is lodged with the temp card system 22, if necessary, which can then initiate resolving the pending transaction by the temp card system 22. For example, after the temporary card 33 is removed or otherwise expires, the remaining funds from the initial allocation can be credited back to the card holder account, akin to a hold placed on an account for automatic withdrawals, pre-approved fuel pump purchases, hotel damage deposits, etc.

Figure 10:
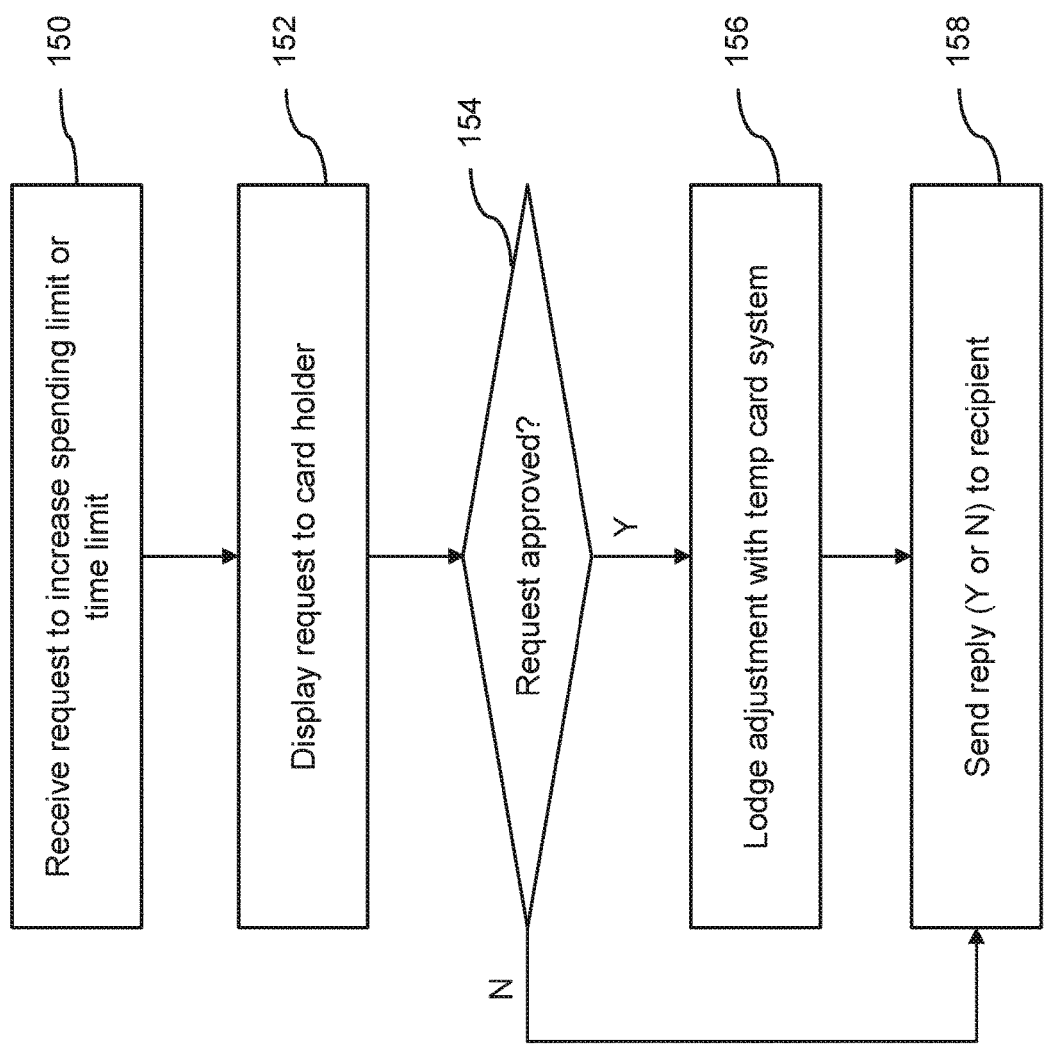
FIG. 10 is a flow diagram of an example of computer executable instructions for handling requests to increase a spending limit or time limit for a temporary card

Referring now to FIG. 10, an example embodiment of computer executable instructions for handling requests to increase a spending limit or time limit for a temporary card is shown. At block 150, a card holder receives a request to increase a spending limit or time limit to spend the funds. This request can be issued through the temp card app 20 or via another channel such as an email, text message, app notification, etc. At block 152 the request is displayed to the card holder, and it is determined at block 154 whether the request has been approved. For example, the request can provide options to request or deny via any suitable input such as a selection, voice input, reply code, etc. If the request is approved, the adjustment is lodged with the temp card system 22 at block 156. Whether the request is approved or not, a reply is generated at block 158, indicating same.

Figure 11:
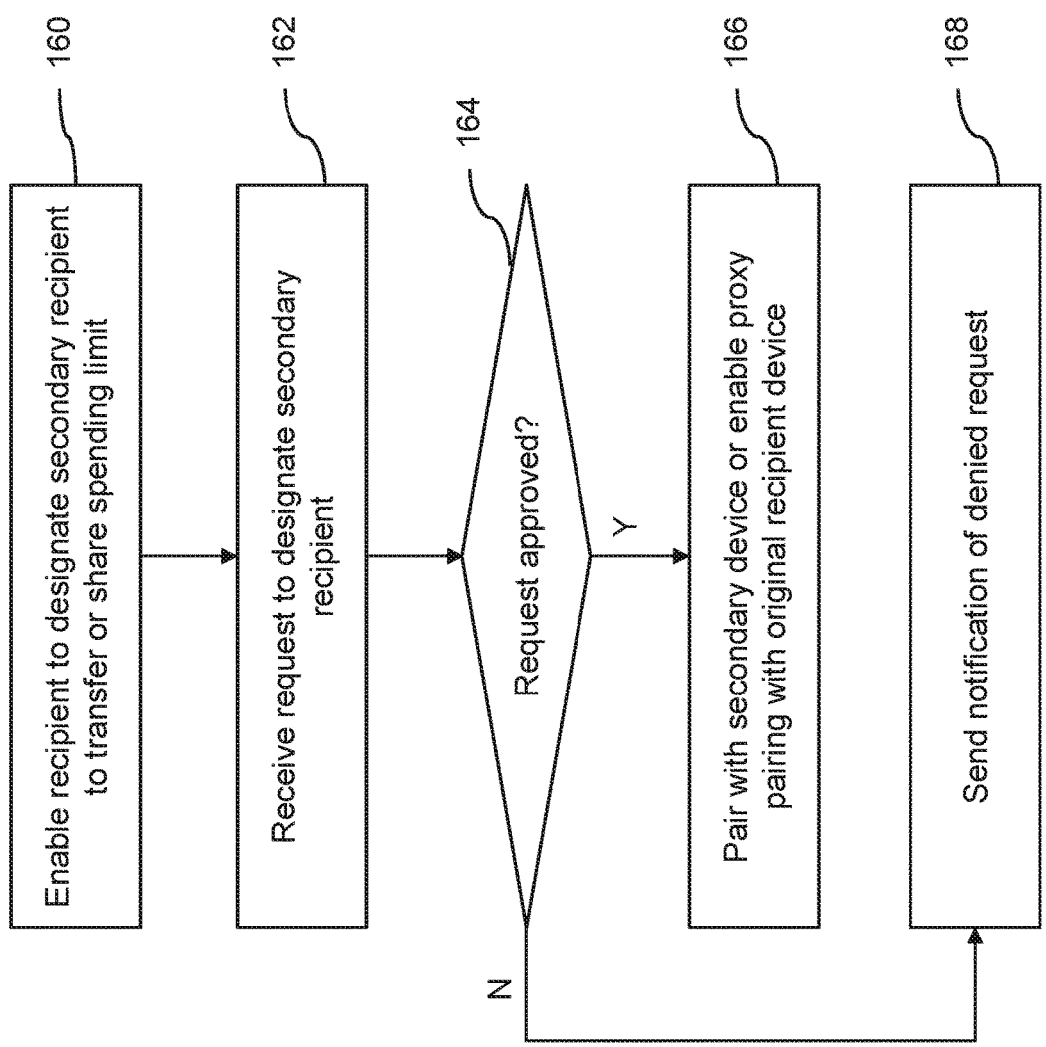
FIG. 11 is a flow diagram of an example of computer executable instructions for enabling a recipient to designate a secondary recipient and obtain approval therefor.

Referring now to FIG. 11, an example embodiment of computer executable instructions for enabling a recipient to designate a secondary recipient and obtain approval therefor is shown. At block 160, the temp card app 20 and/or temp card system 22 by way of a permission granted by the card holder, enables a recipient to designate one or more secondary recipients to transfer the remaining funds to or to split/share the spending limit as discussed above. At block 162, the card holder receives a request to designate a specific secondary recipient, e.g., to add a second layer of approval to ensure not only that the recipient can share or transfer funds but that they can do so with appropriate secondary recipients. This request can be received by the card holder using any suitable channel as exemplified above with respect to FIG. 10. At block 164, it is determined whether the request has been approved. If so, the card holder device 12 can pair with the secondary recipient device 13 directly or as discussed above, the recipient device 13 can pair with the secondary recipient device 13 as a proxy. It can be appreciated that this can be provided as an option to the card holder, via the card holder device 12. At block 168, a notification of a denied request to transfer or share is sent to the requester if the request is not approved.

Figure 12:
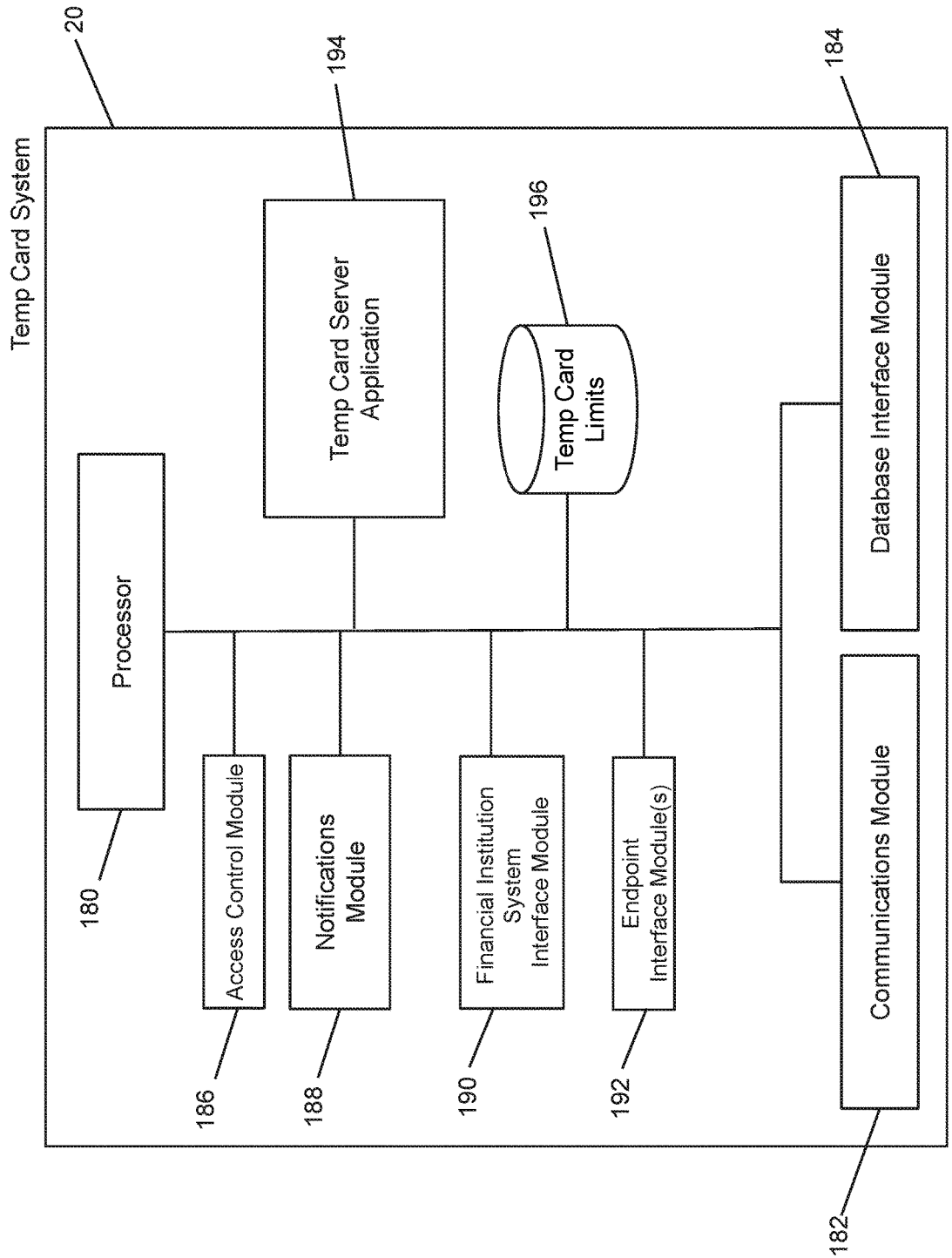
FIG. 12 is a block diagram of an example configuration of the temp card system.

In FIG. 12, an example configuration of the temp card system 22 is shown. In certain embodiments, the temp card system 22 may include one or more processors 180, a communications module 182, and a database interface module 184 for interfacing with the data 36, 40 to retrieve, modify, and store (e.g., add) data. The temp card system 22 can be embodied as one or more server devices and/or other computing device(s) configured to operate within computing environment 8. Communications module 182 enables the temp card system 22 to communicate with one or more other components of the computing environment 8, such as client devices 12, 13 (or one of its components), via a bus or other communication network, such as the communication network 14. While not delineated in FIG. 12, the temp card system 22 includes at least one memory or memory device that can include a tangible and non-transitory computer-readable medium having stored therein computer programs, sets of instructions, code, or data to be executed by processor 180. FIG. 12 illustrates examples of modules, tools and engines stored in memory on the temp card system 22 and operated by the processor 180. It can be appreciated that any of the modules, tools, and engines shown in FIG. 12 may also be hosted externally and be available to the temp card system 22, e.g., via the communications module 182. In the example embodiment shown in FIG. 12, the temp card system 22 includes a temp card server application 194 that can be used to communicate with temp card apps 20 in client/server relationships. The temp card system 22 also includes an access control module 186, a notifications module 188, a financial institution system interface module 190, one or more endpoint interface modules 192, and a data storage mechanism for the temp card limits 196.

Referring again to FIG. 12, the access control module 186 may be used to apply a hierarchy of permission levels or otherwise apply predetermined criteria to determine what client data 40 can be shared with which entity in the computing environment 8. For example, the temp card system 22 may have been granted access to certain sensitive client data 40 or financial data for a user, which is associated with a certain client device 12, 13 in the computing environment 8. Similarly, certain client profile data stored in the client data 40 may include potentially sensitive information such as age, date of birth, or nationality, which may not necessarily be needed by the temp card system 22 to execute certain actions. As such, the access control module 186 can be used to control the sharing of certain client profile data or other client data 40 and/or content stored in the datastores for app data 36 and/or client data 40 and/or other financial data based on a type of client/user, a permission or preference, or any other restriction imposed by the computing environment 8 or application in which the temp card system 22 is used.

The temp card system 22 may also include the notifications module 188 configured to send alerts or notifications via appropriate channels via the mobile application server 18, based on actions determined by the temp card system 22 and/or triggered by users of the client devices 12, 13. The temp card system 22 may also include one or more endpoint interface modules 192 to enable the temp card system 22 to integrate with and communicate with the enterprise endpoints 24 as discussed above. The interface module(s) 192 can take the form of an application programming interface (API), software development kit (SDK) or any other software, plug-in, agent, or tool that allows the temp card system 22 to be integrated with or within an application associated with another entity.

The temp card system 22 may also include the financial institution system interface module 190 to provide a graphical user interface (GUI) or API connectivity to communicate with the financial institution system 16 to obtain client data 40 and financial data for a certain user. It can be appreciated that the financial institution system interface module 190 may also provide a web browser-based interface, an application or "app" interface, a machine language interface, etc.

Figure 13:
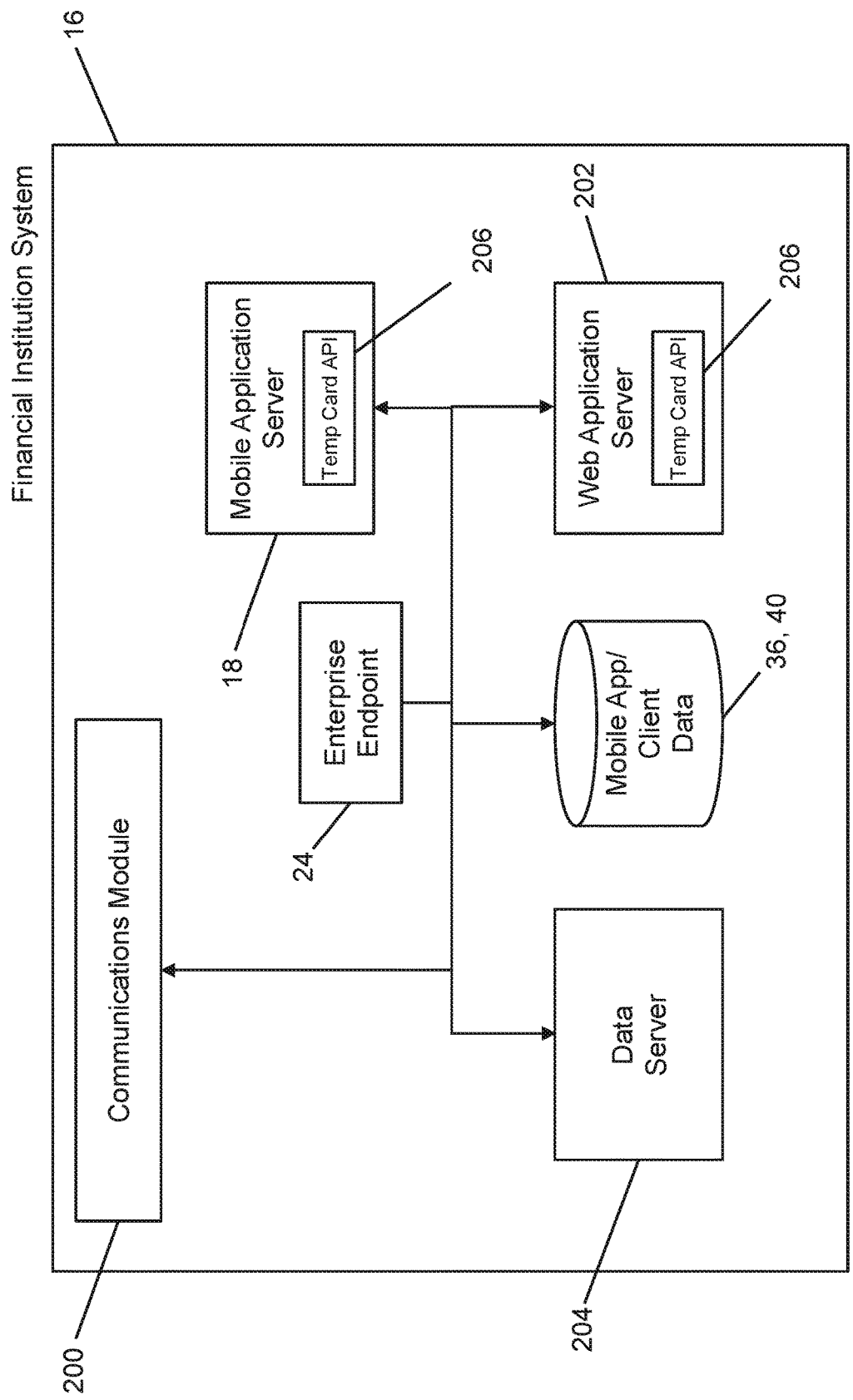
FIG. 13 is a block diagram of an example configuration of a financial institution system.

In FIG. 13, an example configuration of the financial institution system 16 is shown. The financial institution system 16 includes a communications module 200 that enables the financial institution system 16 to communicate with one or more other components of the computing environment 8, such as client devices 12, 13 (or one of its components) or temp card system 22, via a bus or other communication network, such as the communication network 14. While not delineated in FIG. 13, the system 16 includes at least one memory or memory device that can include a tangible and non-transitory computer-readable medium having stored therein computer programs, sets of instructions, code, or data to be executed by one or more processors (not shown for clarity of illustration). FIG. 13 illustrates examples of servers and datastores/databases operable within the system 16. It can be appreciated that any of the components shown in FIG. 13 may also be hosted externally and be available to the system 16, e.g., via the communications module 200. In the example embodiment shown in FIG. 13, the financial institution system 16 includes one or more servers to provide access to the client data app data 36 and/or client data 40 to the temp card system 22 via or on behalf of the enterprise endpoint(s) 24 to enable the temp card system 22 to operate as disclosed herein. Exemplary servers include the mobile application server 18, a web application server 202 and a data server 204. Although not shown in FIG. 13, as noted above, the system 16 may also include a cryptographic server for performing cryptographic operations and providing cryptographic services. The cryptographic server can also be configured to communicate and operate with a cryptographic infrastructure. The financial institution system 16 may also include one or more data storages for storing and providing data for use in such services, such as data storage for storing mobile app data 36 and/or client data 40.

Mobile application server 18 supports interactions with the mobile app 26 and/or temp card app 20 installed on client devices 12, 13. Mobile application server 18 can access other resources of the financial institution system 16 to carry out requests made by, and to provide content and data to, temp card app 20 and/or mobile app 26 on client device 12. In certain example embodiments, mobile application server 18 supports a mobile banking application 26 to provide payments from one or more accounts of user, among other things. As shown in FIG. 13, the mobile application server 18 can include a temp card API 206 which enables the mobile banking app 26, for example, to integrate or otherwise coordinate or work with the temp card system 22 to provide temp card functionalities as herein discussed or to otherwise incorporate or navigate to the temp card app 22.

Web application server 202 supports interactions using a website accessed by a web browser application 28 running on the client devices 12, 13. It can be appreciated that the mobile application server 18 and the web application server 202 can provide different front ends for the same application, that is, the mobile (app) and web (browser) versions of the same application. For example, the financial institution system 16 may provide a banking application that be accessed via a smartphone or tablet app while also being accessible via a browser on any browser-enabled device. As shown in FIG. 13, the web application server 202 may also include temp card API 206 to provide similar temp card functionalities to a web version of the mobile banking app 26, if desired.

The client data 40 may include financial data, which can be associated with users of the client devices 12, 13 (e.g., customers of the financial institution). The financial data may include any data related to or derived from financial values or metrics associated with customers of a financial institution associated with the financial institution system 16, for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 12, 13. As indicated above, it can be appreciated that the client data 40 shown in FIG. 13 may be part of the financial data held by the financial institution system 16 and is shown separately for ease of illustration and ease of reference herein. An enterprise endpoint 24 is shown in FIG. 13 for illustrative purposes. It can be appreciated that any one or more endpoints 24 may be located within the bounds of the financial institution system 16 as shown in FIG. 13 or may be located elsewhere and communicable therewith.

Figure 14:
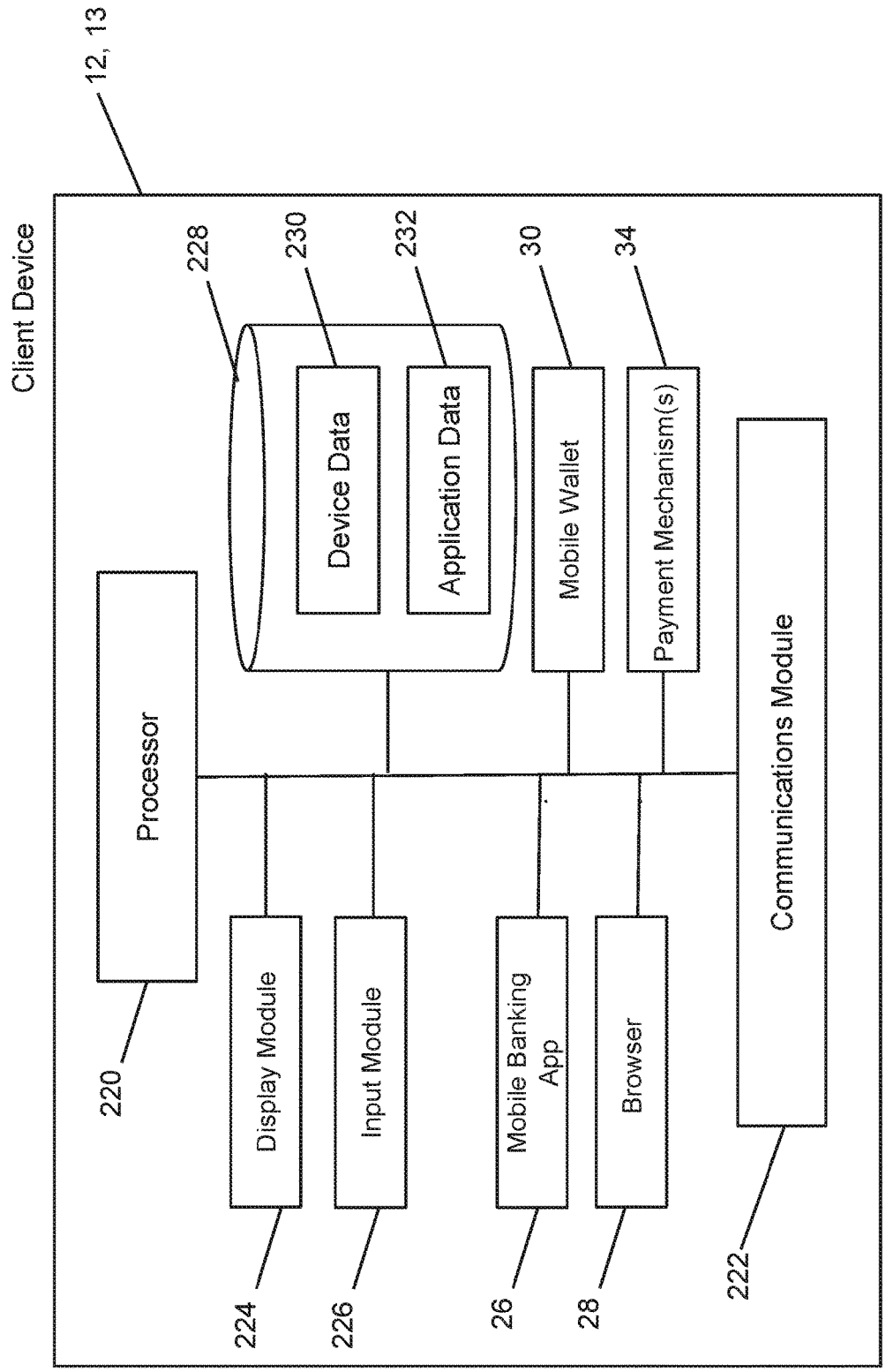
FIG. 14 is a block diagram of an example configuration of a client computing device associated with a user, customer, or client.

In FIG. 14, an example configuration of the client devices 12, 13 is shown. In certain embodiments, the client device 12, 13 may include one or more processors 220, a communications module 222, and a data store 228 storing device data 230 and application data 232. Communications module 222 enables the client device 12, 13 to communicate with one or more other components of the computing environment 8, such as temp card system 22 or financial institution system 16, via a bus or other communication network, such as the communication network 14. While not delineated in FIG. 14, the client device 12, 13 includes at least one memory or memory device that can include a tangible and non-transitory computer-readable medium having stored therein computer programs, sets of instructions, code, or data to be executed by processor 220. FIG. 14 illustrates examples of modules and applications stored in memory on the client device 12, 13 and operated by the processor 220. It can be appreciated that any of the modules and applications shown in FIG. 14 may also be hosted externally and be available to the client device 12, 13, e.g., via the communications module 222.

In the example embodiment shown in FIG. 14, the client device 12, 13 includes a display module 224 for rendering GUIs and other visual outputs on a display device such as a display screen, and an input module 226 for processing user or other inputs received at the client device 12, 13, e.g., via a touchscreen, input button, transceiver, microphone, keyboard, etc. As noted above, the client device 12, 13 can use such an input module 226 to gather inputs that are indicative of behavioral cues, facial recognition, presence detection, etc. The client device 12, 13 may include the mobile banking application 26 provided by the financial institution system 16, e.g., for performing mobile banking operations. The client device 12, 13 in this example embodiment also includes a web browser application 28 for accessing Internet-based content, e.g., via a mobile or traditional website. The data store 228 may be used to store device data 230, such as, but not limited to, an IP address or a MAC address that uniquely identifies client device 12, 13, within environment 8. The data store 228 may also be used to store application data 232, such as, but not limited to, login credentials, user preferences, cryptographic data (e.g., cryptographic keys), etc. Also shown in FIG. 14, the client device 12, 13, can include a mobile wallet 30 and payment mechanism(s) 34 as described above.

It will be appreciated that only certain modules, applications, tools and engines are shown in FIGS. 2, 3, and 12 to 14 for ease of illustration and various other components would be provided and utilized by the temp card system 22, financial institution system 16, and client device 12, 13, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in temp card system 22 or financial institution system 16, or client device 12, 13, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for authorizing temporary use of accounts, the system comprising:
a processor;
a communications module coupled to the processor; and
a memory coupled to the processor, the memory storing computer executable instructions that when executed by the processor cause the processor to:
detect that an account holder of an account has selected available funds to be shared with a recipient mobile device, the available funds being within the account;
determine a spending limit for sharing of the available funds, the spending limit applying to transactions by the recipient mobile device, the spending limit being set by the account holder;
generate and post a pending transaction against the account for the spending limit;
provide, via a proximity based electronic mechanism, information to enable an application on the recipient mobile device to interact with the system managing the account to perform transactions with the shared available funds from the account, the application completing subsequent transactions by having them applied to the pending transaction of the account;
detect a proposed purchase by the recipient mobile device with the shared available funds;
determine, with the application or a related application server, whether the detected purchase complies with the spending limits;
in response to the detected purchase conforming with the spending limits, modify the pending transaction in the account to reflect the detected purchase; and
resolve the pending transaction in the account in response to one or more pre-determined criteria being satisfied.

2. The system of claim 1, wherein the computer executable instructions further cause the processor to: restrict functionality of the application to disable access to the information shared via the proximity based electronic mechanism in response to the pending transaction resolving.

3. The system of claim 1, wherein the application is prevented from using the shared available funds in response to the system hosting the account determining the pending transaction has been resolved.

4. The system of claim 1, wherein the one or more pre-determined criteria comprise a time limit, and wherein the computer executable instructions further cause the processor to:
detect a request by the recipient to extend a time limit criterion of the one or more pre-determined criteria;
send the request to the account holder and provide an option to extend the time limit or deny the request.

5. The system of claim 1, wherein a user interface is provided as an option within a mobile banking application to the account holder to provide selections or impose the one or more pre-determined criteria on the shared available funds, the mobile banking application being available via an app or a browser.

6. The system of claim 1, wherein a user interface is provided as a standalone application having access to a mobile banking application to provide selections or impose the one or more pre-determined criteria on the shared available funds.

7. The system of claim 1, wherein the computer executable instructions further cause the processor to:
detect a request to transfer the information enabling the application on the recipient mobile device to interact with the system hosting the account to perform transactions with the shared available funds from the account to a secondary recipient device;
obtain approval of the request to transfer from the account holder; and
enable, on the recipient device, the proximity based electronic mechanism to transfer the information from the recipient device to the secondary recipient device.

8. The system of claim 1, wherein the proximity based electronic mechanism comprises a link sent by the account holder to the other party via an electronic communication channel.

9. The system of claim 1, wherein the proximity based electronic mechanism comprises a near-field pairing process initiated by an account holder device or the recipient mobile device.

10. The system of claim 1, wherein the system hosting the account updates the application or a related application server with a remaining amount of the spending limit.

11. The system of claim 1, wherein one or more limitations for the application are transferred to the application via the proximity based electronic mechanism.

12. The system of claim 1, wherein the application transfers one or more limitations to the secondary recipient device.

13. A method of authorizing temporary use of accounts, the method executed by a system and comprising:
detecting that an account holder of an account has selected available funds to be shared with a recipient mobile device, the available funds being within the account;
determining a spending limit for sharing of the available funds, the spending limit applying to transactions by the recipient mobile device, the spending limit being set by the account holder;

generating and posting a pending transaction against the account for the spending limit;

providing, via a proximity based electronic mechanism, information to enable an application on the recipient mobile device to interact with the system managing the account to perform transactions with the shared available funds from the account, the application completing subsequent transactions by having them applied to the pending transaction of the account;

detecting a proposed purchase by the recipient mobile device with the shared available funds;

determining, with the application or a related application server, whether the detected purchase complies with the spending limits;

in response to the detected purchase conforming with the spending limits, modifying the pending transaction in the account to reflect the detected purchase; and resolving the pending transaction in the account in response to one or more pre-determined criteria being satisfied.

14. The method of claim 13, further comprising:

restricting functionality of the application to disable access to the information shared via the proximity based electronic mechanism in response to the pending transaction resolving.

15. The method of claim 13, wherein the application is prevented from using the shared available funds in response to the system hosting the account determining the pending transaction has been resolved.

16. The method of claim 13, further comprising:

detecting a request by the recipient to increase the one or more pre-determined criteria comprising a pending transaction upper limit; and sending the request to the account holder and provide an option to increase the transaction amount or deny the request.

17. The method of claim 13, wherein the one or more pre-determined criteria comprise a time limit, the method further comprising:

detecting a request by the recipient to extend a time limit criterion of the one or more pre-determined criteria; and sending the request to the account holder and provide an option to extend the time limit or deny the request.

18. The method of claim 13, further comprising:

providing a temporary card user interface to the account holder; and detecting selection of the payment card via the user interface.

19. The method of claim 13, further comprising:

detecting a request to transfer the information enabling the application on the recipient mobile device to interact with the system hosting the account to perform transactions with the shared available funds from the account to a secondary recipient device;

obtaining approval of the request to transfer from the account holder; and enabling, on the recipient device, the proximity based electronic mechanism to transfer the information from the recipient device to the secondary recipient device.

20. A non-transitory computer readable medium for authorizing temporary use of accounts, the computer readable medium comprising computer executable instructions for:

detecting that an account holder of an account has selected available funds to be shared with a recipient mobile device, the available funds being within the account;

determining a spending limit for sharing of the available funds, the spending limit applying to transactions by the recipient mobile device, the spending limit being set by the account holder;

generating and posting a pending transaction against the account for the spending limit;

providing, via a proximity based electronic mechanism, information to enable an application on the recipient mobile device to interact with the system managing the account to perform transactions with the shared available funds from the account, the application completing subsequent transactions by having them applied to the pending transaction of the account;

detecting a proposed purchase by the recipient mobile device with the shared available funds;

determining, with the application or a related application server, whether the detected purchase complies with the spending limits; and in response to the detected purchase conforming with the spending limits, modifying the pending transaction in the account to reflect the detected purchase; and resolving the pending transaction in the account in response to one or more pre-determined criteria being satisfied.

* * * * *